United States Patent [19]

Bulharowski

[11] 3,809,807
[45] May 7, 1974

[54] FILM FRAME POSITION DETECTOR
[75] Inventor: John Francis Bulharowski, Rochester, N.Y.
[73] Assignee: GTE Sylvania Incorporated, Seneca Falls, N.Y.
[22] Filed: July 16, 1970
[21] Appl. No.: 55,448

[52] U.S. Cl. .......................... 178/7.2, 178/DIG. 21
[51] Int. Cl. ............................................. H04n 5/38
[58] Field of Search............... 178/6.7 A, 7.3, 7.2 D, 178/69.5 TV; 352/92; 235/61.113; 179/100.2 S; 350/DIG. 1

[56] References Cited
UNITED STATES PATENTS
2,890,297  6/1959  Dulte ............................ 178/7.2 D
2,302,081  11/1942  Weitmann ..................... 235/61.113
2,922,841  1/1960  Graziano ......................... 178/7.2 D Primary Examiner—John W. Caldwell
Assistant Examiner—Richard P. Lange
Attorney, Agent, or Firm—Norman J. O'Malley; Robert E. Walrath; Thomas H. Buffton

[57] ABSTRACT

A photographic film scanning system includes an electromechanical transducer contiguous with the film and responsive to the sprocket holes therein for providing electrical signals representative of the positional location of the film frames in a film scanning zone.

3 Claims, 2 Drawing Figures

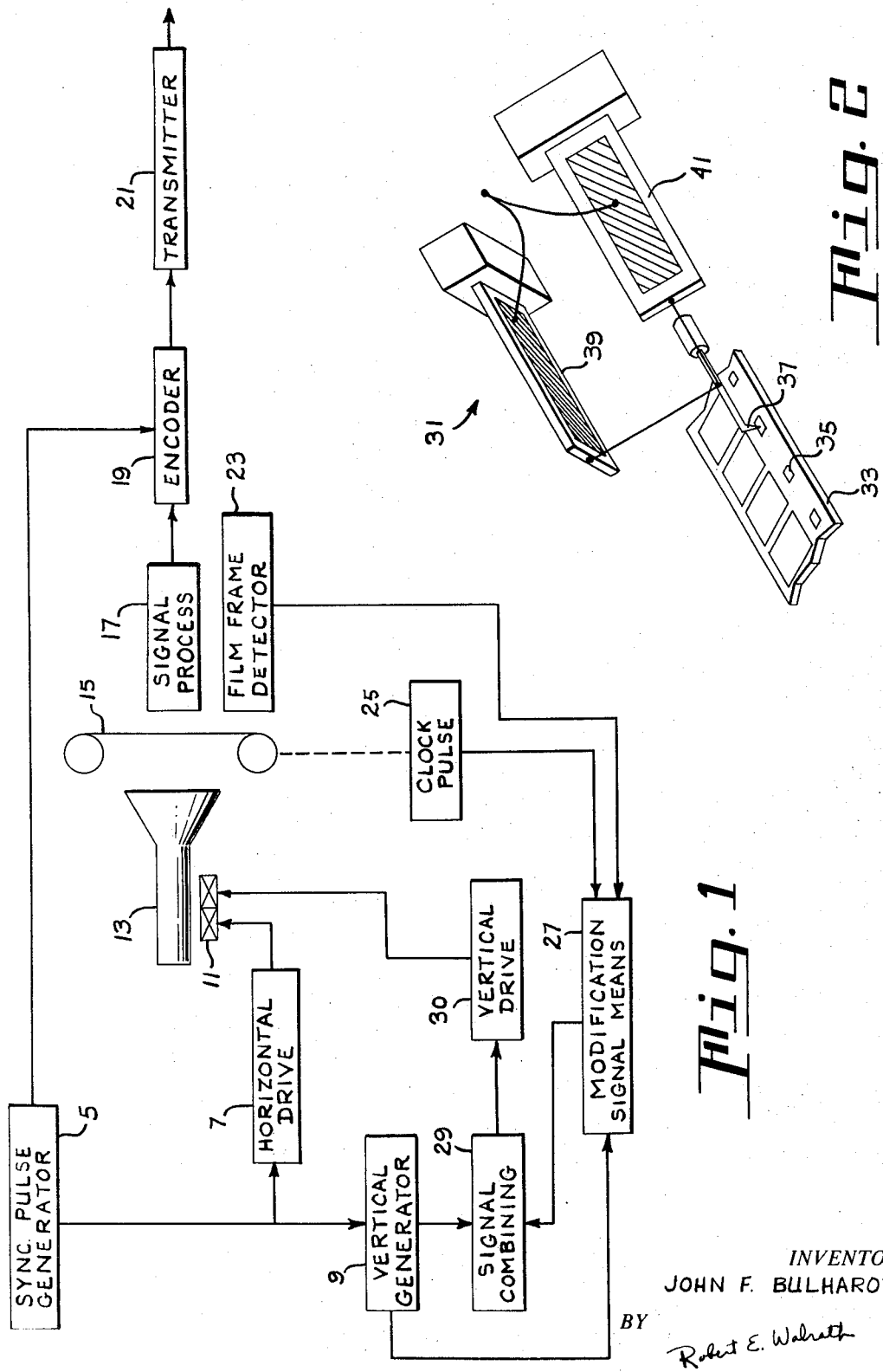

3,809,807

FILM FRAME POSITION DETECTOR

CROSS-REFERENCE TO OTHER APPLICATIONS

A co-pending application entitled "Variable Speed Continuous Motion Film and Television Scan Synchronization," filed Apr. 15, 1970 and having U.S. Pat. Ser. No. 28,864 sets forth a preferred system for light scanning a continuously moving photographic film.

BACKGROUND OF THE INVENTION

In one form of visual image display system, a photographic film of film frames is continuously moved and scanned by a light beam during the continuous movement to provide signals representative of image information on the film. These signals are processed and applied to a cathode ray tube to provide a visual image display.

One of the problems associated with a visual image display or a "flying spot" scanner system is the synchronization of the positional location of the film frames within a film scanning zone with the light source or apparatus for scanning the film. Moreover, the problem of synchronized scanning and film positional location is even more acute when the system is employed in conjunction with a television system wherein the vertical scanning rate is not an even multiple of the film frame rate.

One known technique for effecting development of a signal for positionally locating the film frames within the film scanning zone includes a light source and a light detector or photocell. Therein, a sprocket hole in the film is employed to allow intermittent transmission of light from the light source to the light detector. Thus, a signal representative of the positional location of the film frames is provided.

Although the above-mentioned technique has been and still is employed, it has been found that there are conditions under which such techniques do leave something to be desired. For example, it has been found that variations in density of the photographic film and burrs at the edge of the film indicating aperture tend to cause difficulty in sensing the exact positional location of a film frame within the film scanning zone. Moreover, such systems tend to be relatively expensive and cumbersome.

Another known technique for indicating the positional location of film frames within a film scanning zone includes a mechanical contact type device. Therein, a mechanical contact electrode is formed to enter an aperture in the film and establish an electrical connection with a second contact on the opposite side of the film. Also, mechanical systems are provided wherein an electrical signal is provided by movement of a contact point into an aperture whereby an electrical circuit is interrupted.

Again, mechanical contact systems are often employed in conjunction with relays and similar apparatus. However, it has been found that mechanical contact systems ordinarily require a pressure of at least forty grams if reliability is to be achieved. Unfortunately, such pressures would deleteriously affect a film strip and tend to undesirably distort the apertures therein.

OBJECTS AND SUMMARY OF THE INVENTION

It is an object of the present invention to provide an enhanced system for positionally locating a film within a film scanning zone. Another object of the invention is to provide an improved electro-mechanical transducer means for positionally locating a film. A further object of the invention is to provide an improved system for positionally locating a continuously moving film within a film scanning zone.

These and other objects, advantages and capabilities are achieved in one aspect of the invention by apparatus which includes a continuously moving film of film frames having a plurality of sprocket holes and an electro-mechanical transducer means contiguous with the film and responsive to the sprocket holes to provide electrical signals representative of the positional location of the film frames in the film scanning zone.

BRIEF DESCRIPTION OF THE DRAWINGS

FIG. 1 illustrates, in block form, a visual image system for deriving a display from photographic film; and FIG. 2 illustrates, in diagrammatic form, an electromechanical transducer for deriving signals from a film.

PREFERRED EMBODIMENT OF THE INVENTION

For a better understanding of the present invention, together with other and further objects, advantages and capabilities thereof, reference is made to the following disclosure and appended claims in conjunction with the accompanying drawings.

Referring to the drawings, FIG. 1 illustrates a system for developing signals from a film suitable for providing a visual image display. A synchronizing pulse generator 5 provides synchronizing pulse signals which are applied to a horizontal drive circuit 7 and to a vertical signal generator 9. The horizontal drive circuit 7 provides horizontal scanning signals which are applied to deflection apparatus 11 associated with a light source 13 in the form of a flying spot scanner tube.

A continuously moving film of film frames 15 having a plurality of sprocket holes is disposed adjacent the light source 13 and a signal processing network 17 is positioned on a side of the film 15 opposite to the light source 13. In the usual manner, an appropriate optical system is employed to focus light from the light source 13 onto the film 15 and to direct the light available from the film 15 to the signal processing network 17 which includes the necessary light detection apparatus.

The signal processing network 17 provides signal information derived from the film 15 which is applied to a signal encoder 19. Also, synchronizing signals available from the sync pulse generator 5 are applied to the encoder 19. In turn, the encoder 19 applies the necessary encoded signals to a transmitter 21 wherefrom suitable television signals emanate.

Also associated with the film of film frames 15 is a film frame detector 23 and a clock pulse generator 25. The film frame detector 23 continuously provides electrical signals representative of the positional location of a film frame as it progresses through a film scanning zone and the clock pulse generator 25 provides a plurality of clock pulse signals which are applied to a vertical scan modification means 27.

The vertical signal modification means 27 also receives signal from the vertical signal generator 9 and develops a pair of ramp modification signals. Each of the pair of ramp modification signals is initiated in response to a signal from the film frame detector 23. Also, each signal from the film frame detector 23 is derived from a sprocket hole which is representative of a film frame of the film 15. Thus, each film frame of the film 15 is represented by a sprocket hole which causes initiation of separate ramp modification signals.

These ramp modification signals from the vertical signal modification means 27 are applied to a signal combining means 29 which also receives signals from the vertical signal generator 9. Therein, the vertical signal generator and vertical modification signals are combined to provide a modified vertical scanning signal. This modified vertical scanning signal is applied to the light source 13 via the vertical drive circuitry 30 and the deflection apparatus 11 to effect vertical scanning of the light source 13 in accordance with the varying positional location of a frame of film 15 in a film scanning zone.

Referring more specifically to the film frame detector 23, a preferred form of film frame detector 23 is illustrated in FIG. 2. Therein is illustrated an electromechanical transducer means in the form of a piezoelectric device such as a stereophonic phonographic pickup device 31. Moreover, monaural phonographic pickup devices as well as electromagnetic devices are also applicable and appropriate. Also, the pickup device 31 is contiguous with a photographic film 33 having a plurality of sprocket holes 35 extending longitudinally therealong.

The pickup device 31 has a stylus 37 and left and right piezoelectric devices, 39 and 41 respectively. In the usual manner, the left and right piezoelectric devices 39 and 41 are each responsive to movement of the stylus 37 to provide separate output signals. Also, each of the piezoelectric devices 39 and 41 provides an output signal which may be represented by a 45° vector and when series connected provide a combined output signal which may be represented by a vertical vector having about 1.4 times the magnitude of the 45° vector. This resultant signal available from the series connected piezoelectric devices is applied to the vertical signal modification means 27 to effect an indication of the positional location in a film scanning zone of each film frame of the film 15.

In operation, the photographic film 33 is continuously moving and includes a sprocket hole 35 for each film frame thereon. As the leading edge of a sprocket hole 35 reaches the stylus 37 of the pickup device 31, the stylus 37 drops into the sprocket hole 35. Upon reaching the opposite end of the sprocket hole 35, the stylus 37 exits therefrom and rides on the film 33 until the next sprocket hole 35 arrives. Thus, ingress and egress of the stylus 37 from a sprocket hole 35 causes development of an electrical signal having a leading and a trailing edge.

Further, it can be seen that reversal of direction of travel of the film 15 would ordinarily reverse the leading and trailing edges of the electrical signal derived from the film. However, it should be noted that reversal of the direction of film travel requires reversal in selection of the leading and trailing edges of the electrical signal such that the same film and signal edge is employed for reference regardless of the direction of film travel. Thus, each film frame or sprocket hole provides but one referenced position and film framing adjustments, due to reversal of film direction, are minimized.

Thus, there has been provided unique apparatus for positionally locating film frames of stationary or continuously moving film in a film scanning zone. The apparatus is inexpensive, readily available, realiable, and much less complicated and cumbersome than other known apparatus. Moreover, it was found that the above-mentioned apparatus was operable at film speeds in the range of about 2 to 50 frames per second without mis-registration while mechanical systems tended to "float" and mis-register at rates above about 25 to 30 frames per second.

While there has been shown and described what is at present considered the preferred embodiment of the invention, it will be obvious to those skilled in the art that various changes and modifications may be made therein without departing from the invention as defined by the appended claims.

We claim:

1. In a film scanning system wherein a photographic film of film frames is light scanned within a scanning zone, apparatus for positionally locating the film frames within the scanning zone comprising:
   means for continuously moving a film of film frames having a plurality of sprocket holes extending therealong through said scanning zone; and
   electromechanical transducer means in the form of a phonograph sensing means with a stereophonic pickup means having a pair of channels series connected to provide a single output signal and having a stylus formed for ingress and egress of said sprocket holes, said transducer means contiguous with said film and responsive to the edge of said film forming said sprocket holes therein for providing an electrical signal representative of the positional location of said film frames within said scanning zone.

2. The apparatus of claim 1 wherein said sensing means includes a pair of piezoelectric devices each responsive to movement of said stylus to provide separate output signals.

3. The apparatus of claim 1 wherein said sensing means includes a pair of channels combined to provide an output signal which is the vector sum of the signals available from each one of the channels.

* * * * *